United States Patent
Mao et al.

(10) Patent No.: US 9,985,508 B2
(45) Date of Patent: May 29, 2018

(54) VIBRATING MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 174 days.

(21) Appl. No.: 15/062,099

(22) Filed: Mar. 5, 2016

(65) Prior Publication Data

US 2017/0033652 A1    Feb. 2, 2017

(30) Foreign Application Priority Data

Jul. 31, 2015    (CN) .................... 2015 2 0572437 U

(51) Int. Cl.
*H02K 33/00* (2006.01)
*H02K 7/10* (2006.01)
*H02K 33/16* (2006.01)
*H02K 7/02* (2006.01)

(52) U.S. Cl.
CPC ............... *H02K 33/16* (2013.01); *H02K 7/02* (2013.01)

(58) Field of Classification Search
CPC ............................... H02K 33/16; H02K 29/03
USPC .................................. 310/15, 25, 36, 51, 81
See application file for complete search history.

(56) References Cited

U.S. PATENT DOCUMENTS

2014/0219494 A1\* 8/2014 Kim ...................... H04R 9/047
                                                                    381/400
2016/0254736 A1\* 9/2016 Jin .......................... H02K 33/16
                                                                    310/25

FOREIGN PATENT DOCUMENTS

CN            103401395 A    * 11/2013

\* cited by examiner

*Primary Examiner* — Jose Gonzalez Quinone
(74) *Attorney, Agent, or Firm* — Na Xu; IPro, PLLC

(57) ABSTRACT

A vibrating motor is provided in the present disclosure. The vibrating motor includes a shell providing an accommodating space, a vibrating system accommodated in the accommodating space, and a flexible circuit board. The vibrating system includes a coil assembly, and the flexible circuit board includes a fixing part fixed to the shell, a connecting part connected to the coil assembly, and a flexible connecting arm connected between the fixing part and the connecting part.

12 Claims, 3 Drawing Sheets

VIBRATING MOTOR

FIELD OF THE DISCLOSURE

The present disclosure generally relates to vibrator technologies, and more particularly, to a vibrating motor for providing vibration feedback.

BACKGROUND

With development of mobile communication technologies, mobile devices, such as mobile phones, handheld game players, tablet computers, portable multimedia players, or the like, become more and more popular. Mobile devices generally include vibrating motors for generating vibration feedback. For example, a vibrating motor may be used in a mobile phone for performing vibration and providing system feedback while receiving an incoming call or a message such as a short message, a multimedia message, an instant message, or a push message.

A typical vibrating motor includes a vibrator and a coil for driving the vibrator to vibrate, the coil includes a lead wire for receiving an electric signal. However, when the vibrator operates in a resonance state with great vibration amplitude, the lead wire of the coil may be over-stretched and suffer fracture, which may further cause the vibrating motor to become failure. Therefore, a reliability of the vibrating motor is low.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
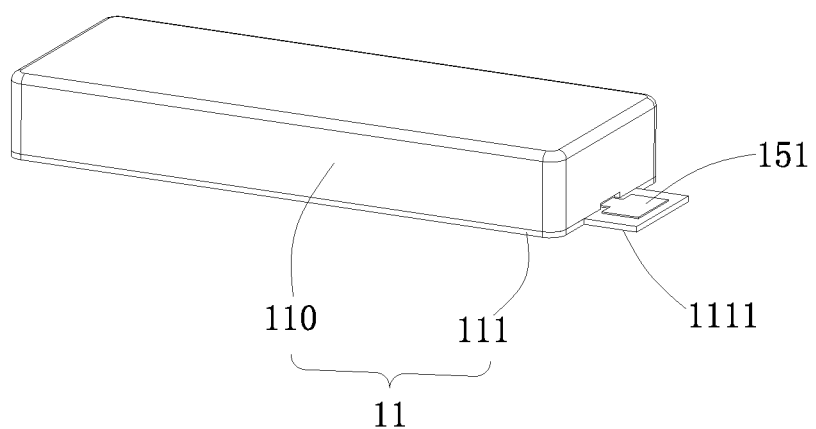
FIG. 1 is a schematic assembled view of a vibrating motor according to an exemplary embodiment of the present disclosure.
Figure 2:
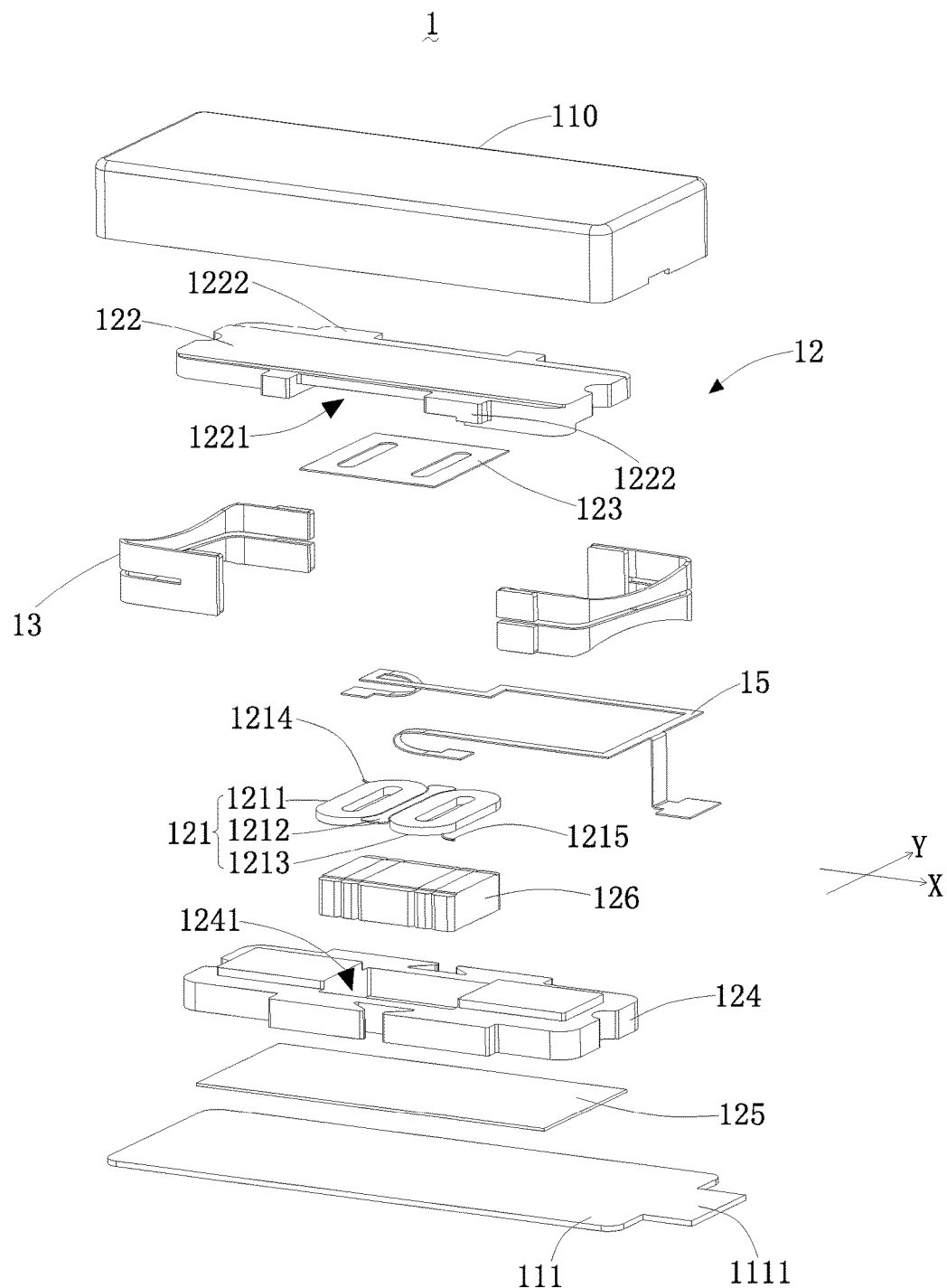
FIG. 2 is an exploded view of the vibrating motor in FIG. 1.

Referring to FIGS. 1-2, a vibrating motor 1 according to an exemplary embodiment of the present disclosure is shown. The vibrating motor 1 includes a shell 11 for providing an accommodating space, a vibrating system 12 accommodated in the accommodating space, a pair of elastic connectors 13 for elastically suspending the vibrating system 12 in the shell 11, and a flexible circuit board 15 for transmitting electric signals to drive the vibrating system 12 to perform linear vibrate along a vibration direction. The vibration direction of the vibrating system 12 may be parallel to an X-axis direction as illustrated in FIG. 2.

The shell 11 includes a base 111 and a cover 110 covering the base for forming the accommodating space. The base 111 includes a supporting platform 1111 extending from an end of the base 111, the supporting platform 111 is coplanar with a main surface of the base 111, and is not covered by the cover 110. The supporting platform 1111 may include one or more solder pad for electrically connecting to an external circuit.

The vibrating system 12 includes a first vibrating unit and a second vibrating unit. The first vibrating unit includes a first mass member 122, a first pole plate 123 and a coil assembly 121. The first mass member 122 is in a substantially rectangular plate shape, and includes a groove 1221 recessed from a bottom surface thereof for receiving the coil assembly 121. The first mass member 122 may also include a pair of protrusions 1222 protruding outwards from two opposite sidewalls thereof along a Y-axis direction perpendicular to the vibration direction (i.e., the X-axis direction). The pair of protrusions 1222 is diagonally located at two opposite sides of the groove 1221, and is adjacent to the groove 1221. The first pole plate 123 is attached to the coil assembly 121, and is also received in the groove 1221.

The coil assembly 121 may include a first coil 1211, a second coil 1213 and a circuit substrate 1212. The circuit substrate 1212 may be a flexible printed circuit board for supporting the first coil 1211 and the second coil 1213. The first coil 1211 and the second coil 1213 are electrically connected in serial via the circuit substrate 1212. In particular, the first coil 1211 includes a first lead wire 1214, and the second coil 1213 includes a second lead wire 1215; both of the first lead wire 1214 and the second lead wire 1215 may be led out from a bottom of the coil assembly 121 along two opposite directions.

The second vibrating unit includes a second mass member 124, a second pole plate 125 and a magnet 126. The second mass member 124 is also in a substantially rectangular plate shape, and includes a through hole 1241 formed at a central region thereof. The through hole 1241 is opposite to the groove 1221 of the first mass member 122, and the magnet 126 is received in the through hole 1241. The second pole plate is attached to a bottom surface of the second mass block 125.

Figure 3:
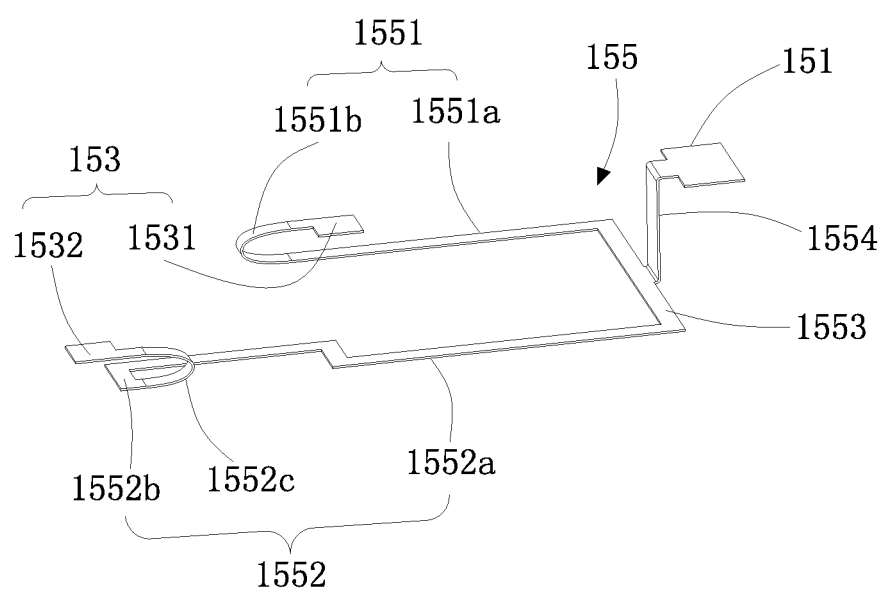
FIG. 3 is a schematic view of a flexible circuit board of the vibrating motor of FIG. 1.

Referring also to FIG. 3, the flexible circuit board 15 of the vibrating motor 1 includes a fixing part 151 fixed to the shell 11, a connecting part 153 electrically connected to the vibrating system 12, and a flexible connecting arm 155 connected between the fixing part 151 and the connecting part 153.

The fixing part 151 may have a shape and a size in accordance with the supporting platform 1111 of the base 111, for example, the fixing part 151 may be in a rectangular shape, and the fixing part 151 is electrically fixed onto the supporting platform 111.

The connecting part 153 includes a first connecting end 1531 electrically connected to the first lead wire 1214 of the first coil 1211, and a second connecting end 1532 electrically connected to the second lead wire 1215 of the second coil 1213.

The flexible connecting arm 155 includes a first connecting strip 1551 connected to the first connecting end 1531, a second connecting strip 1552 connected to the second connecting end 1532, a third connecting strip 1553 connected between the first connecting strip 1551 and the second connected strip 1552, and a fourth connecting strip 1554 connected between the third connecting strip 1553 and the fixing part 151.

The first connecting strip 1551 includes a first strip portion 1551a and a first curved portion 1551b. The first strip portion 1551a is connected between a first end of the third connecting strip 1553 and the first curved portion

1551b. The first curved portion 1551b extends towards the fixing part 151 from an end of the first strip portion 1551a in a U-shaped manner, and the first connecting end 1531 is connected to an end of the first curved portion 1551b.

The second connecting strip 1552 includes a second strip portion 1552a, a third strip portion 1552b and a second curved portion 1552c. The second strip portion 1552a is an orthogonal zigzagged strip portion connected between a second end of the third connecting strip 1553 and the third strip portion 1552b. The third strip portion 1552b is perpendicularly connected to an end of the second strip portion 1552a. The second curved portion 1552c extends opposite to the fixing part 151 from an end of the third strip portion 1552b in a U-shaped manner, and the second connecting end 1532 is connected to an end of the second curved portion 1552c.

The second strip portion 1552a of the second connecting strip 1552 is substantially parallel to the first strip portion 1551a of the first connecting strip 1551, and the third strip portion 1552b is substantially parallel to the third connecting strip. Both the first strip portion 1551a and the second strip portion 1552a is substantially perpendicular to the third connecting strip 1553

Moreover, the first strip portion 1551a of the first connecting strip 1551, the second strip portion 1552a and the third strip portion 1552b of the second connecting strip 1552, and the third connecting strip 1553 is coplanar with each other. The first connecting end 1531 and the second connecting end 1532 are coplanar with each other, but are non-coplanar with the first strip portion 1551a, the second strip portion 1552a, the third strip portion 1552b and the third connecting strip 1553. The fourth connecting strip 1554 extends vertically from a central edge of the third strip portion 1552b, and is connected to the fixing part 151. With the above-described configuration, the first connecting strip 1551, the second connecting strip 1552, the third connecting strip 1553 and the fourth connecting strip 1554 cooperatively form a frame structure matching a profile of the first mass member 122.

The flexible circuit board 155 may be placed on an upper surface of the first mass member 122, the first curved portion 1551b and the second curved portion 1552c enables the first connecting end 1531 and the second connecting end 1532 to bypass the pair of protrusions 1222 of the first mass member 122. Accordingly, the first connecting end 1531 can be fixed to a bottom of one of the protrusions 1222, and is connected to the second lead wire 1215 of the second coil 1213 by welding; similarly, the second connecting end 1532 can be fixed to a bottom of the other one of the protrusions 1222, and is connected to the first lead wire 1214 of the first coil 1211 by welding. Furthermore, the fixing part 151 of the flexible circuit board 15 can extend to the supporting platform 1111 of the base 111 via the fourth connecting strip 1554, and is further connected to the external circuit for receiving the electric signals via the solder pad on the supporting platform 1111.

In operation, the coil assembly 121 receives the electric signals via the flexible circuit board 155, and drives the vibrating system 12 to perform linear vibration. During the vibration of the vibrating system 12, the connecting part 153 and the flexible connecting arm 155 of the flexible circuit board 155 are driven to vibrate accompanying with the coil assembly 121 and the lead wires 1214 and 1215 thereof, and consequently, the lead wires 1214 and 1215 can be protected from being over-stretched. As such, a reliability of the vibrating motor 1 can be improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibrating motor, comprising:
a shell providing an accommodating space;
a vibrating system accommodated in the accommodating space and comprising a coil assembly, the coil assembly comprising a first coil with a first lead wire and a second coil with a second lead wire, the first coil and the second coil are electrically connected in series; and
a flexible circuit board comprising a fixing part fixed to the shell, a connecting part connected to the coil assembly, and a flexible connecting arm connected between the fixing part and the connecting part, wherein
the connecting part of the flexible circuit board comprises a first connecting end connected to the first lead wire of the first coil, and a second connecting end connected to the second lead wire of the second coil;
the flexible connecting arm comprises a first connecting strip connected to the first connecting end, a second connecting strip connected to the second connecting end, a third connecting strip connected between the first connecting strip and the second connected strip;
the first connecting strip comprises a first strip portion connected to a first end of the third connecting strip, and a first curved portion connected to the first connecting end; the first curved portion extends towards the fixing part from an end of the first strip portion in a U-shaped manner.

2. The vibrating motor as described in claim 1, wherein the second connecting strip comprises a second strip portion connected to a second end of the third connecting strip, a second curved portion connected to the second connecting end, and a third strip portion connected between the second strip portion and the second curved portion.

3. The vibrating motor as described in claim 2, wherein the second strip portion is an orthogonal zigzagged strip portion connected between the second end of the third connecting strip and the third strip portion, the third strip portion is perpendicularly connected to an end of the second strip portion, and the second curved portion extends opposite to the fixing part from an end of the third strip portion in a U-shaped manner.

4. The vibrating motor as described in claim 3, wherein the second strip portion of the second connecting strip is substantially parallel to the first strip portion of the first connecting strip, and both the first strip portion and the second strip portion is substantially perpendicular to the third connecting strip.

5. The vibrating motor as described in claim 3, wherein the first strip portion, the second strip portion, the third strip portion, and the third connecting strip is coplanar with each other; the first connecting end and the second connecting end are coplanar with each other, but are non-coplanar with the first strip portion, the second strip portion, the third strip portion and the third connecting strip.

6. The vibrating motor as described in claim 5, wherein the flexible connecting arm further comprises a fourth connecting strip extending vertically from a central edge of the third strip portion, and is connected to the fixing part.

7. The vibrating motor as described in claim 6, wherein the shell comprises a base and a cover covering the base for forming the accommodating space; the base comprises a supporting platform extending from and coplanar with the base, the fixing part of the flexible circuit board is electrically fixed to the supporting platform.

8. The vibrating motor as described in claim 6, wherein the first connecting strip, the second connecting strip, the third connecting strip and the fourth connecting strip cooperatively form a frame structure matching a profile of the first mass member.

9. The vibrating motor as described in claim 8, wherein the vibrating system further comprises a first mass member and a first pole plate, the first mass member comprises a groove recessed from a bottom surface thereof for receiving the coil assembly, the first pole plate is attached to the coil assembly, and is also received in the groove.

10. The vibrating motor as described in claim 9, wherein the first mass member further comprises a pair of protrusions protruding outwards from two opposite sidewalls thereof along a direction perpendicular to a vibration direction of the vibrating system, the pair of protrusions is diagonally located at two opposite sides of the groove.

11. The vibrating motor as described in claim 10, wherein the flexible circuit board is placed on the first mass member, the first connecting end and the second connecting end bypass the pair of protrusions to be connected with the coil assembly respectively via the first curved portion and the second curved portion.

12. The vibrating motor as described in claim 9, wherein the vibrating system further comprises a second mass member, a second pole plate and a magnet, the second mass block comprises a through hole opposite to the groove of the first mass member; the magnet is received in the through hole, and the second pole plate is attached to a bottom surface of the second mass block.

\* \* \* \* \*